United States Patent Office 2,708,102
Patented May 10, 1955

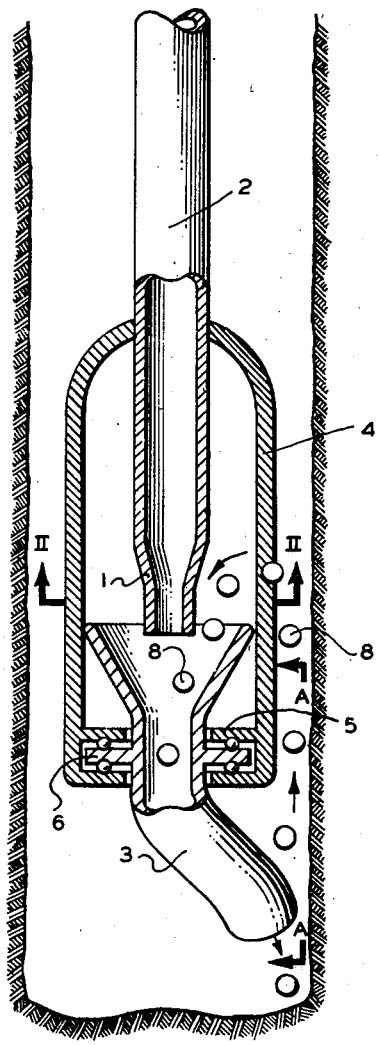
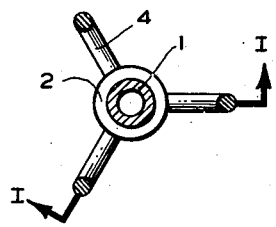
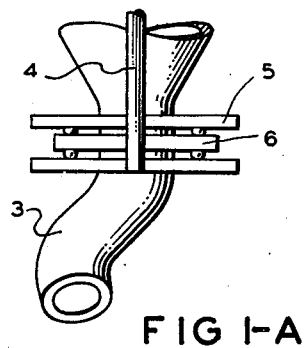

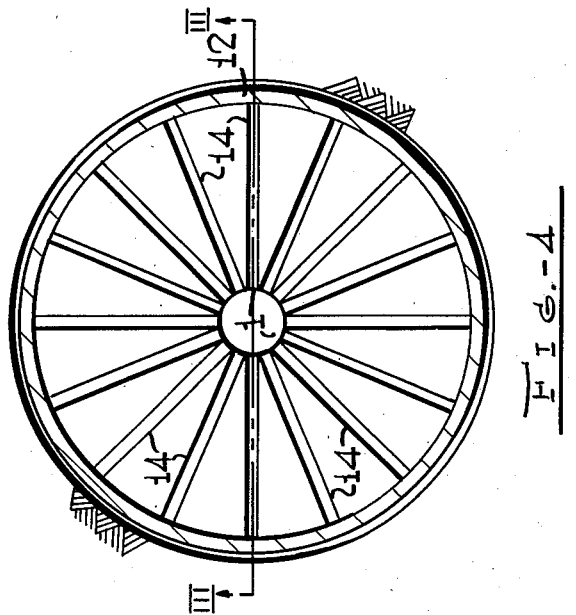
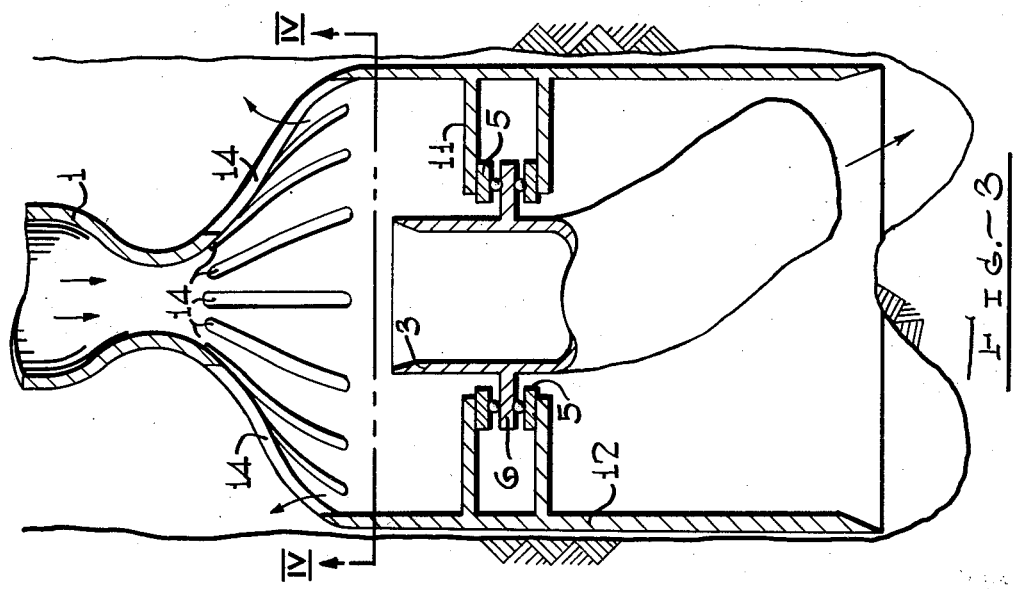

2,708,102

SELF-ROTATING PELLET IMPACT DRILL BIT

William A. Freeman, Jr., and John M. Camp, Tulsa, Okla., assignors to Esso Research and Engineering Company, a corporation of Delaware Application January 29, 1952, Serial No. 268,892

5 Claims. (Cl. 255—61)

This invention concerns a novel drilling apparatus adapted to eject a high velocity stream of pellets in order to secure the drilling action by the impact force of these pellets. The drill bit of this invention is particularly characterized by provision for the support of a nozzle element in freely rotatable manner. By somewhat inclining this nozzle element, nozzle reaction resulting from jetting of fluid and pellets through the nozzle may be employed to rotate the nozzle. This self-rotation of the nozzle referred to as a result of jet reaction increases the diameter of the bore hole which may be drilled and increases the efficiency of drilling by reducing pellet to pellet impacts along the rebounding path of the pellets.

It is now appreciated that a desirable drilling action may be obtained by forcefully propelling a multitude of pellets against the earth formation to be drilled. In order to understand the operation of this invention, it is necessary to appreciate the fundamentals of pellet impact drilling of this character.

The basic principles of pellet impact drilling are fundamentally simple. Means are simply required to provide a jet of high velocity fluid including provision for entraining and accelerating pellets in this jet of fluid. The requisites of this drilling procedure concern the nature of the pellets employed, and the fluid employed therewith as a propelling and recirculation agent for the pellets.

The pellets to be employed must be of substantial size. Thus it has been found that granular pellets or pellets having a diameter less than about ⅛ of an inch are relatively ineffective in drilling. In general the rate of drilling attainable increases as the size of the pellets is increased. For this reason it is generally preferred to employ the largest pellets possible, consistent with the nozzle size of the apparatus and the fracturing characteristics of the pellets. As will be emphasized, the nature of the drilling fluid employed also has a bearing on the size of the pellets. However, it may be stated that when employing a gas, such as air, for the drilling fluid, pellets of about ⅛ to a quarter of an inch in diameter are to be employed. When using a liquid, such as water or drilling mud, as the drilling fluid, the pellets may range in size from about ¼ to 1 inch. The preferred size range in this case is between ½ and ¾ of an inch.

It is important that the pellets have the greatest practical density. It is apparent that the greater the density of a given sized pellet the greater the kinetic energy which can be attained and the greater the impact force which can be developed. Again, as will be brought out, the separation characteristics of the pellets from the drilling fluid employed play an important part in drilling efficiency. Since the separation rate of the pellets from a fluid depends in part upon the density of the pellets, it is apparent that this factor again dictates use of a high density pellet.

The configuration and surface characteristics of the pellets are also important. The pellets should be substantially spherical in nature and should have a smooth surface so as to limit wear of the jet nozzle assembly through which the pellets are to be ejected. In this connection it is fundamental that a spherical body possesses the best resistance to fracture due to impact; no other shape possesses the mechanical strength of a sphere. The factors of spherical configuration and smooth surface also relate to the separation characteristics of the pellets from the entraining fluid as will be noted below.

In view of these considerations the pellets to be employer are generally metal spheres having the desired properties of impact resistance, hardness, and toughness. Iron, steel and other ferrous alloys may be employed to prepare the pellets. In this connection, however, it should be observed that it is essential that the metal chosen be non-brittle in character. Thus, for example, finished ball bearings have been found to be impractical for use in this invention although ball bearing blanks obtained prior to surface hardening are satisfactory. Due to their high density, tungsten carbide alloys of the less brittle character are attractive for use in the pellets to be employed. Again, alloys of this character or other dense metals may be employed as a pellet core material, surfaced by ferrous alloys having the requisite toughness.

As suggested heretofore, the separation characteristics of the pellets from the drilling fluid play an important part in the efficiency of pellet impact drilling. It is apparent that in jetting a stream of fluid, entraining the pellets referred to, against a formation to be drilled, it becomes important that the pellets readily separate from this stream of fluid. This is required so that the pellets will not be cushioned by the fluid and will not be inefficiently swept from the drilling zone in the fluid flow stream. Again, regardless of the type of pellet recirculation employed, it becomes necessary in some manner to subsequently secure separation of pellets from an upward flow of drilling mud in the bore hole for return and recirculation of the pellets to the drilling zone.

Consequently, as emphasized heretofore, pellets of the character defined must be employed to have the separation characteristics required for effective drilling. In this connection it is apparent that the nature of the drilling fluid employed also affects the separation characteritics of the pellets. From this viewpoint it is desirable to employ a drilling fluid having the lowest viscosity and lowest density practical, consistent with other requirements of the drilling fluid. It has been found that the drilling rate obtainable is proportional to the ratio of the density of the pellets to the density of the drilling fluid. This consideration makes the use of air or other gas attractive. Similarly, if a liquid is to be employed, water or other low density liquid is preferably employed. Nonetheless, if considered desirable, drilling muds of the character conventionally used in rotary drilling may be employed.

Recirculation of the pellets in the immediate vicinity of the drilling zone may be accomplished in a number of ways. When the pellets have been forced against a formation by jetted fluid, the fluid flow will carry the pellets outwardly and upwardly in an annular channel along the wall of the bore hole. At some point spaced above the bottom of the bore hole, it becomes necessary therefore to separate the entrained pellets from the upflowing drilling fluid. One method by which this may be accomplished is to provide a low velocity fluid zone above the drilling apparatus in which the pellets may settle by gravity into a recirculation system. Such a low velocity zone may be provided by narrowing the cross-sectional area of the apparatus immediately above the drill so as to provide an enlarged annular space in the bore hole. This gravity recirculation can be supplemented or substituted by a mechanical deflection system serving to maintain the pellets in captive recirculation. A shroud may be employed for this purpose of a character substantially blocking the bore hole but containing passages through which drilling fluid and pulverized earth formation may be carried to the surface of the earth.

It is generally desirable in obtaining a suitable ejection of pellets to employ a nozzle assembly utilizing a primary and secondary jet nozzle. The primary nozzle is employed to convert fluid pumping pressure to velocity energy. Consequently fluid pumped through the primary nozzle is subjected to a substantial pressure drop, of 100 pounds per sq. inch or more, to provide a constricted directed high velocity jet of fluid. A secondary nozzle is positioned immediately below and concentric with the primary nozzle. The secondary nozzle should have a substantially greater diameter than the primary nozzle to accommodate the total volume of fluid from the primary nozzle in addition to the volume of pellets there entrained. This configuration and arrangement of nozzles, by its nature, creates an aspirating effect which plays a part in the recirculation of the pellets.

These basic principles of pellet impact drilling are usefully employed in the apparatus of this invention. It is a basic characteristic of pellet impact drilling that an efficient directed nozzle assembly will tend to cut a bore hole of limited diameter. Dispersion of a directed jet of fluid and pellets to provide an enlarged bore hole is not desirable. The use of a number of jet nozzle assemblies is complicated and again is not particularly desirable. It is, therefore, the purpose of this invention to avoid these difficulties and to enable use of a single jet nozzle assembly to cut a substantially larger bore hole than ordinarily obtainable.

This is accomplished by positioning a secondary jet nozzle directly below a primary nozzle. Both the primary and secondary nozzles may be arranged on the principal axis of the drill, which in use corresponds to the axis of the bore hole. The secondary nozzle is mounted in a suitable bearing arrangement to permit free rotation. Consequently by skewing the secondary nozzle somewhat, the jet reaction developed as fluid is pumped through this nozzle will cause rotation of the nozzle. This results in redirection of the fluid jet and entrained pellets to cut a desirable drilling pattern.

Two of the preferred embodiments of this invention are illustrated in the accompanying drawings. In these drawings:

Figure 1 illustrates in elevational detail, partly in section, the simplest basic form of a drill bit employing the principles of this invention, the view representing a section taken on line I—I of Figure 2;

Figure 1-A is a broken elevational view of a portion of the drill bit of Figure 1 taken in the direction A—A;

Figure 2 is a cross-sectional view of Figure 1 looking upwardly along the line II—II of Figure 1;

Figure 3 is a cross-sectional elevation view of a drill bit including other features, and in particular employing a shroud to aid in recirculation of pellets to the secondary nozzle, the view being a section taken on line III—III of Figure 4.

Figure 4 is a cross-sectional view of the apparatus of Figure 3 looking upwardly along line IV—IV to clearly show the arrangement of slots in the upper portion of the shroud member.

Referring first to Figures 1, 1-A and 2, the drill illustrated employs a primary nozzle 1 which may constitute the lower termination of a tubular support member 2, the latter being attached to a drill pipe of conventional character, as for example, by means of threaded couplings. A secondary nozzle 3, which may be an open tubular element having the general configuration illustrated, is positioned directly below primary nozzle 1, in a manner defining an annular opening between the primary nozzle and the top of the secondary nozzle element. The support for the secondary nozzle is provided by a number of supporting arms or hangers 4 extending downwardly from the tubular support member 2. Suitable bearings 5 are provided on each of the supports 4 to accommodate a collar element 6 encircling the throat of secondary nozzle 3. As illustrated in the drawing three hanger elements 4 are employed to support the secondary nozzle. It is apparent that any desired number of hanger elements may be employed.

In accordance with this invention it is essential that nozzle element 3 be inclined away from the axis of the apparatus in a skewed manner, that is the nozzle element must be bent away from its axis of rotation in more than one plane. Thus in Figure 1 of the drawing, the nozzle is curved toward the right and away from the plane of the drawing. As a result of this configuration, on forcing fluid through the secondary nozzle a jet reaction will be set up, causing this nozzle to rotate in the bearings provided for this purpose.

In operating this drill a suitable drilling fluid is pumped through the tubular support member 2 to form a jet of high velocity fluid passing through nozzle 1. This fluid is directed at and passes through the secondary nozzle 3 which is of substantially greater diameter than the primary nozzle. As a result, a strong aspirating force may be set up tending to entrain pellets in the secondary nozzle. The jet of fluid containing the entrained pellets 8 will, therefore, be expelled from the tip of nozzle 3 in the general direction indicated in Figure 1. Pellets rebounding from the bottom of the bore hole will be carried outwardly and upwardly in the stream of drilling fluid to a point above the upper lip of secondary nozzle 3. Here the pellets will be re-entrained in secondary nozzle 3 by virtue of the aspirating force referred to.

While the drilling action proceeds, secondary nozzle 3 will be rotated about its axis at a rotational rate dependent on the curvature applied to the nozzle and the amount of fluid pumped through the nozzle. It is not necessary that a high rotational rate be employed. As a sult of this rotation of secondary nozzle 3, a cutting pattern will be obtained of the nature illustrated in Figure 1. It will be observed this cutting pattern is substantially twice that which would be obtained with the same nozzle arrangement but without rotation of the nozzle. Again, it is notable as indicated by the path of pellets illustrated in the drawing that the direction of travel imparted to the pellets, away from the center of the bore hole, tends to minimize inefficient pellet to pellet impacts.

Referring now to Figures 3 and 4 of the drawings, an embodiment of the invention is illustrated in which a shroud is used as a deflecting means to aid recirculation of the pellets to the secondary nozzle. Elements of the apparatus of Figure 3 similar to elements which have been described, are identified by the same numerals. Thus, it will be noted that a secondary nozzle 3 is again maintained in rotational relationship between bearings 5 in the apparatus of Figure 3. A number of lugs 11 may extend from the shroud member 12 to support the bearings 5. For example, three such lugs may be employed if desired. The shroud member 12 is joined to nozzle 1 and is formed to have the bell shape illustrated. Thus, the shroud opens from its point of attachment with nozzle 1 to a maximum diameter which terminates as a sleeve element below the secondary nozzle 3. Slots 14 are positioned in the upper portion of the shroud adjacent the juncture of the shroud with nozzle element 1. These slots are of a diameter preventing passage of pellets therethrough but permitting passage of drilling fluid and pulverized earth formation produced by pellet impacts against the bottom of the bore hole.

In the operation of the apparatus of Figure 3 a jet of fluid entraining pellets will be propelled from secondary nozzle 3. The direction of pellets and the rotation of nozzle 3 is of the same nature as that described in connection with Figure 1. Pellets forced outwardly and upwardly by circulation of drilling fluid will be guided in their recirculation by the dependent sleeve portion of the shroud. Again as these pellets are forced upwardly by the drilling fluid, the pellets will contact the narrowed portion of the shroud resulting in redirecting the pellets inwardly toward the jet of fluid propelled through the primary nozzle 1. The pellets will thus be forced to reentrain in the fluid stream provided. The slotted shroud member, therefore, serves to maintain efficient and captive recirculation of the pellets in this apparatus.

It is apparent that a number of alternative forms of drill apparatus may be designed employing the principles of this invention. Thus, for example, a variety of means may be employed for suitably supporting the nozzles in rotatable manner to secure the objectives of this invention.

In order to secure the necessary jet reaction to cause rotation of the rotatable nozzle, as described, the nozzle may be curved away from the axis of the bore hole and curved backwardly along the rotational path. This essentially requires that the nozzle be spiral in nature. The same result may be secured by eccentrically positioning the nozzle 3 in collar element 6 provided the nozzle is inclined away from the axis of the bore hole. In all cases, therefore, it is necessary that the nozzle be directed tangentially toward the wall of the bore hole rather than along the axis of the bore hole. The degree of inclination is generally less than 45° and preferably a slight inclination is employed; for example about 15°. This permits full achievement of the objectives of this invention without requiring any substantial change in the direction of the fluid and pellets.

What is claimed is:

1. A drill bit for drilling bore holes in the earth comprising a tubular support member attachable to a drill pipe, a first jet nozzle element fixed to the lower termination of the support member, secondary nozzle support means fixed to said tubular support member and extending downwardly below said first nozzle, and an open tubular nozzle element rotatably supported by said secondary nozzle support means, the upper end of said tubular nozzle element being arranged in general alignment with the first jet nozzle element and defining therewith an annular opening, the tubular nozzle element being bent away from its axis of rotation in more than one plane and terminating at its lower end in a second nozzle whereby the jet reaction resulting from fluid passing therethrough will effect rotation of said tubular nozzle element.

2. A drill bit as defined by claim 1 including a shroud element fixed to said tubular support member, surrounding the lower end of said first jet nozzle and the upper end of said tubular nozzle element and having a dependent skirt portion extending below said second nozzle, said shroud element having open perforations adjacent its juncture with said tubular support member.

3. A drill bit for earth boring comprising a tubular support member attachable to a drill pipe, secondary nozzle support means fixed to, and extending downwardly below, the lower termination of said tubular support member, and an open ended nozzle element rotatably held by said secondary nozzle support means below the termination of said tubular member in a manner defining an annular opening into said nozzle element, said nozzle element being bent out of alignment with its axis of rotation in a manner creating a rotational force thereto when fluid passes through said nozzle element.

4. The apparatus defined by claim 1 in which the said second nozzle has a spiral configuration.

5. The apparatus defined by claim 1 in which the said second nozzle is eccentrically positioned with respect to the principal axis of the drill bit.

References Cited in the file of this patent

UNITED STATES PATENTS

| | | |
|---|---|---|
| 1,502,851 | Gale | July 29, 1924 |
| 2,233,260 | Hawthorne | Feb. 25, 1941 |
| 2,302,567 | O'Neill | Nov. 17, 1942 |